(12) United States Patent
Yoon et al.

(10) Patent No.: US 8,056,354 B2
(45) Date of Patent: Nov. 15, 2011

(54) AIR CONDITIONING SYSTEM USING DEHUMIDIFYING COOLING DEVICE

(75) Inventors: Seok-Mann Yoon, Incheon (KR); Dae-Young Lee, Seoul (KR); Hoon Lee, Yongin (KR); Chang-Ku Kang, Seoul (KR); Sung-Ook Jeong, Seoul (KR)

(73) Assignee: Korea District Heating Corp., Seongnam-si, Gyeonggi-do (KR)

( * ) Notice: Subject to any disclaimer, the term of this patent is extended or adjusted under 35 U.S.C. 154(b) by 948 days.

(21) Appl. No.: 11/990,283

(22) PCT Filed: Mar. 8, 2007

(86) PCT No.: PCT/KR2007/001149
§ 371 (c)(1),
(2), (4) Date: Feb. 11, 2008

(87) PCT Pub. No.: WO2008/041789
PCT Pub. Date: Apr. 10, 2008

(65) Prior Publication Data
US 2010/0154450 A1 Jun. 24, 2010

(30) Foreign Application Priority Data
Feb. 1, 2007 (KR) .................. 10-2007-0010674

(51) Int. Cl.
*F25D 23/00* (2006.01)

(52) U.S. Cl. .............................................. 62/271; 62/94
(58) Field of Classification Search ........... 62/94, 238.1, 62/271, 513, 285
See application file for complete search history.

(56) References Cited

U.S. PATENT DOCUMENTS

| | | | |
|---|---|---|---|
| 6,311,511 B1* | 11/2001 | Maeda | 62/271 |
| 6,370,900 B1* | 4/2002 | Maeda | 62/271 |
| 6,442,951 B1* | 9/2002 | Maeda et al. | 62/94 |
| 2006/0032244 A1* | 2/2006 | Tomlinson | 62/115 |

* cited by examiner

*Primary Examiner* — Melvin Jones
(74) *Attorney, Agent, or Firm* — Kile Park Goekjian Reed & McManus PLLC

(57) ABSTRACT

An air conditioning system using for a dehumidifying cooling device has developed that comprising a heating source for producing hot water, a heat exchanger for transferring heat from the hot water to circulating water, a circulation pump for circulating the resulting hot water heated in the heat exchanger, a heating pipeline connected to the circulation pump for conveying the hot water to a heat supply target area, a user heat exchanger connected to the heating pipeline for conveying hot water to the heat supply target area, a dehumidifying cooling device connected to a hot water pipe of users heat exchanger and installed in each household within the heat supply target area, the dehumidifying cooling device removing moisture from the air by using hot water supplied from the hot water pipe to deal with latent heat load and to lower the temperature of the dehumidified air via evaporation of water contained in the air.

6 Claims, 2 Drawing Sheets

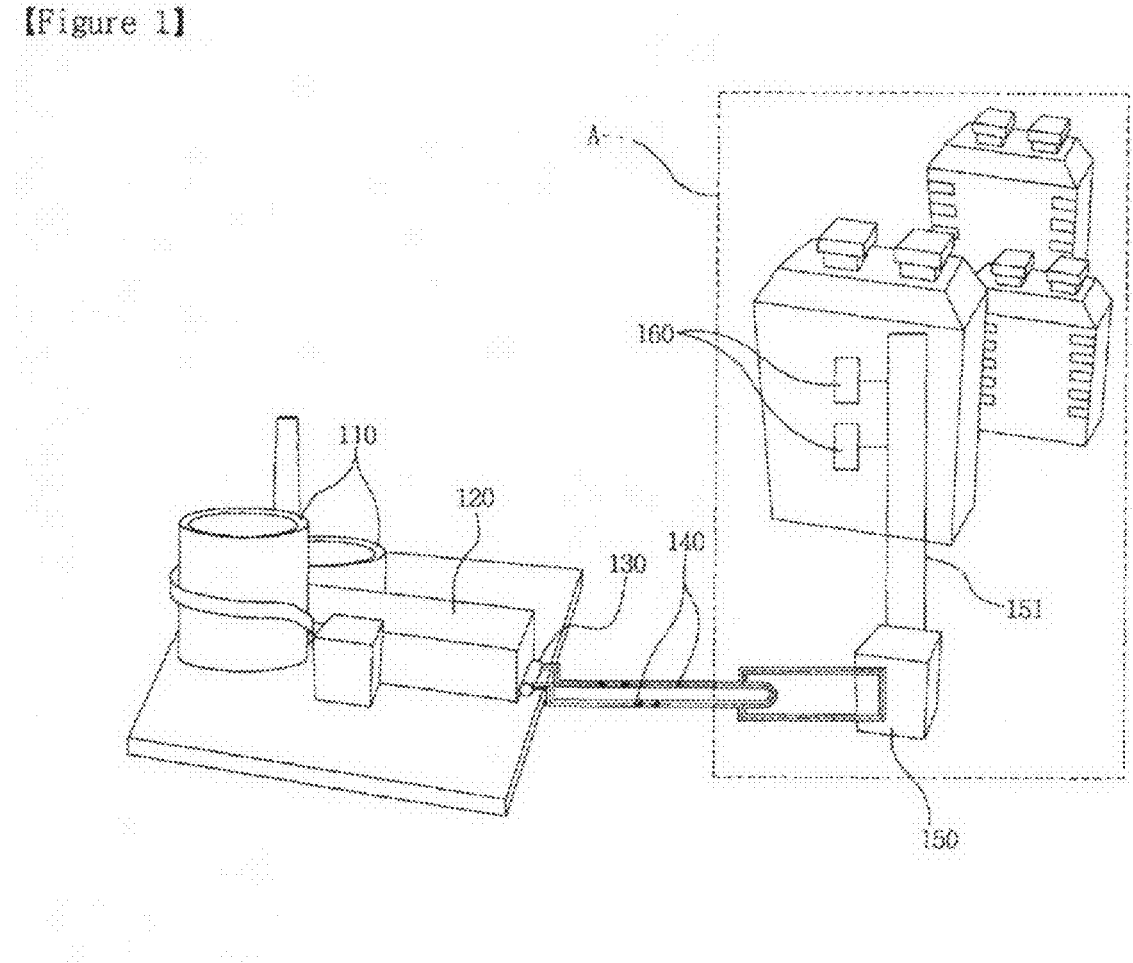
[Figure 1]

[Figure 2]
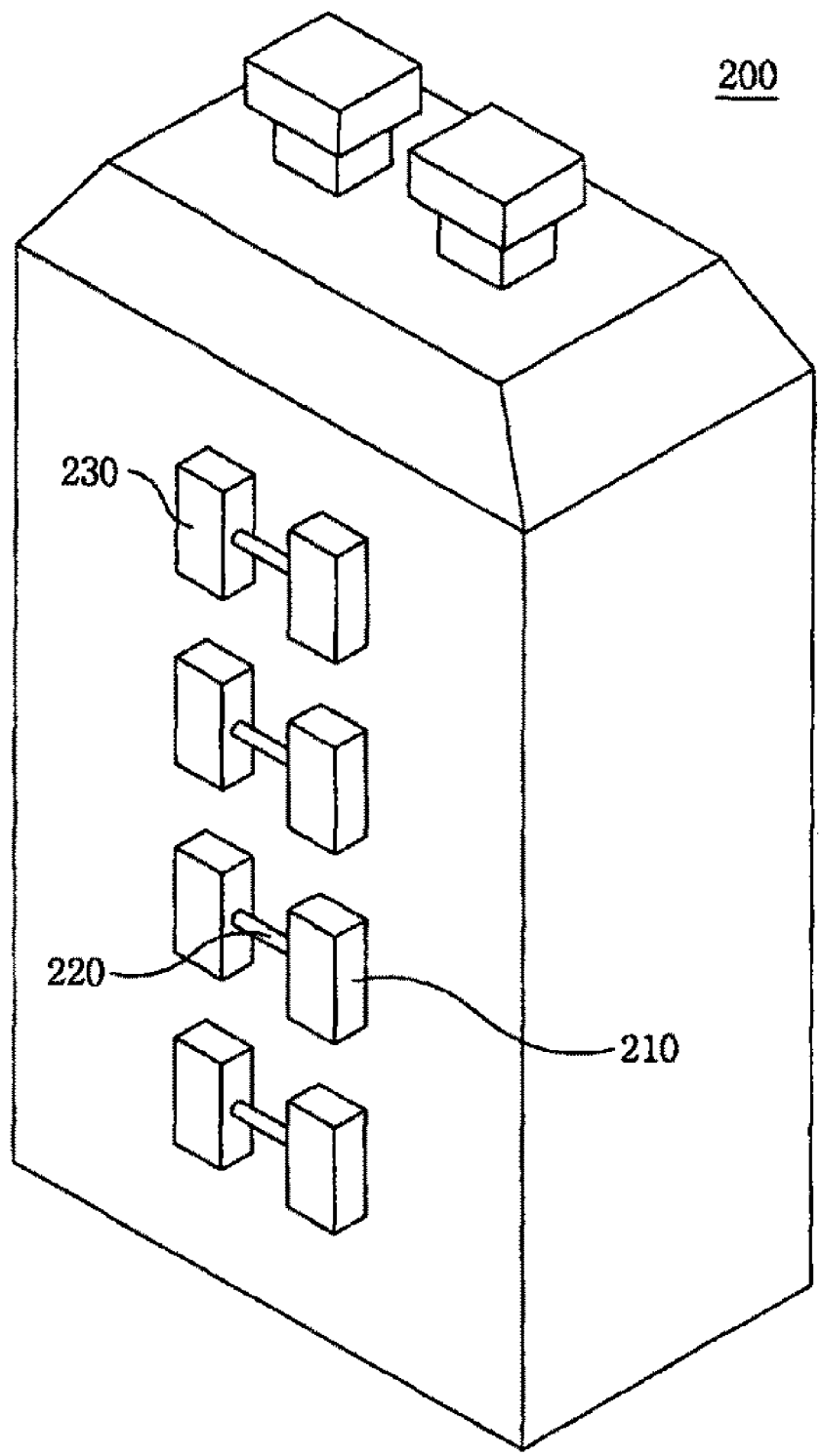

AIR CONDITIONING SYSTEM USING DEHUMIDIFYING COOLING DEVICE

BACKGROUND OF THE INVENTION

1. Field of the Invention

The present invention relates to an air conditioning system using a dehumidifying cooling device, and more particularly, to an air conditioning system using a dehumidifying cooling device which can perform the air cooling operation by using hot water, produced by large-scale or small-scale district heating systems or gas-fired or oil-fired boilers installed in individual households, introduced into the dehumidifying cooling device.

2. Description of the Related Prior Art

There is a developing prospect that the recent high oil prices are not a temporary problem, but will be continuously maintained and fixed. Therefore, the main energy consuming countries of the world will increasingly make great efforts to secure stable energy resources. With the effectuation of the Tokyo protocol dealing with reduction in the discharge of greenhouse gas for the sake of preventing global warming, it will be expected that the international pressure for the limitation of fossil energy use, the criterion of energy efficiency, etc., will be strengthened.

According to a published energy report, the amount of energy consumed in domestic and business fields of Korea in 2003 was approximately 55 millions TOE, and was 25.2% of the total national energy consumption. This rate also corresponds to 41.9% on the basis of electricity use. For the past four years, the energy consumption of domestic and business fields shows an average annual rate of increase of 5.3%, whereas the consumption of electricity shows an average annual rate of increase of 12%. Accordingly, it will be appreciated that the consumption of electricity particularly has experienced a rapid increase. Estimating on the basis of variance in the monthly energy consumption of residential buildings and sample survey results about non-residential buildings as the subject of energy management, it is analyzed that 50% of the energy consumption of residential buildings and 47% of the energy consumption of business buildings are used for air conditioning. In conclusion, of the energy consumption of buildings, energy required for air conditioning occupies 13% of the national total energy consumption of Korea.

Accordingly, to guarantee the efficient use of energy and the continuous development of the energy industry while observing related international agreements, it is necessary to improve the efficiency of energy use for air conditioning in domestic and business fields. From this viewpoint, there is created a so-called collective-energy industry in which thermal energy and electricity, generated by facilities concentrated in a specific place for improving the efficiency of energy in domestic and business fields, are supplied collectively to multiple users in residential and business areas. It is reported that the collective-energy industry uses waste heat created during power generation as a heating source for space heating and hot water heating, thereby achieving not only a reduction of energy by approximately 20 to 30% by virtue of improved efficiency, but also an improvement of air environment by approximately 30 to 40% by virtue of a reduction of fuel usage and intensive environmental management. The collective-energy industry is evaluated as an effective industry, capable of dealing with related international environmental restrictions including climatic change conventions, etc. In the affirmative evaluation's debt, approximately 1.2 million families in Korea shared in the benefits of district heating in 2003, and in particular, 85% of supplied energy was generated by combined heat and power generation. Korea has a plan to expand the propagation of district heating to 2 million families by 2010.

In combined heat and power generation, called cogeneration, the generation ratio of electricity to heat is fixed at 3:5. Therefore, it is important to keep the ratio of electricity to heat at an appropriate level for maximizing the effect of the collective-energy industry. In Korea, the above mentioned generation ratio can be fulfilled in winter, but summer in Korea produces an increased electrical load for air cooling, and substantially no heat load. As a result, the operation rate of dedicatrd heating in summer decreases to less than 10%, and this causes deterioration in the economic efficiency of cogeneration. Actually, no generation results were reported between June and September in 2003.

To improve the operation rate of collective-energy generation facilities for efficiently using the effects of the industry, reducing the demand of heat in summer is necessary, and in particular, development and propagation of a technology for supplying cooling energy using distinct heating facilities is necessary.

In one example of the above described cooling energy supply technology, an absorption chiller is installed in a receptor, such as a large-scale building, etc., such that the chiller performs a central cooling operation using energy delivered from distinct heating facilities.

The absorption chiller is designed to chill water flowing in a pipe, using heat generated during the evaporation of a liquid-phase refrigerant, and condense the evaporated gas-phase refrigerant for reuse.

However, in spite of various researches and developments for improving the performance of the absorption chiller, there is a limit on the improvement of performance due to the low temperature of a heating source. In addition, the absorption chiller has an uneconomical high water return temperature because it cannot use water having a temperature of 80° C. or less, and suffers from a small differential between the temperature of supplied water and the temperature of returned water.

When the absorption chiller is installed in an apartment, etc. taking up the largest portion of district heating to provide central cooling, there is a problem in that cold water pipes have to be additionally installed regardless of hot water supply pipes.

The present invention has been made in view of the above problems, and it is an object of the present invention to provide an air conditioning system using a dehumidifying cooling device which can produce efficient air cooling by incorporating hot water, produced by large-scale or small-scale district heating systems or gas-fired or oil-fired boilers installed in individual households, into the dehumidifying cooling device installed in each household.

SUMMARY OF THE INVENTION

In accordance with one aspect of the present invention, the above and other objects can be accomplished by the provision of an air conditioning system using a dehumidifying cooling device comprising: a heating source for producing hot water having a predetermined temperature; a heat exchanger for transferring heat from the hot water produced by the heating source to circulating water; a circulation pump for circulating the water heated in the heat exchanger at a predetermined pressure; a heating pipeline, connected to the circulation pump, for conveying the hot water to a heat supply target area or withdrawing used water from the heat supply target area; a user heat exchanger connected to the heating pipeline for conveying the hot water in the heating pipeline to the heat supply target area; and a dehumidifying cooling device connected to a hot water pipe, which is associated with the user heat exchanger and mounted in each household within the heat supply target area, the dehumidifying cooling device serving to remove moisture contained in the air by use of the hot water supplied from the hot water pipe to deal with latent heat load and to lower the temperature of the dehumidified air via evaporation of water contained in the air, thereby producing and supplying cooling air.

Preferably, the heating source is any one of a cogeneration plant, a heating boiler, a micro-turbine, a small gas engine, or a small gas turbine.

Preferably, the hot water produced by the heating source has a temperature of 60 to 120° C.

In accordance with another aspect of the present invention, the above and other objects can be accomplished by the provision of an air conditioning system using a dehumidifying cooling device comprising: a heating source installed in each household for producing hot water at a predetermined temperature; a hot water pipe for conveying of the hot water produced by the heating source or withdrawal of used water; and a dehumidifying cooling device installed in each household and connected to the hot water pipe, the dehumidifying cooling device serving to remove moisture from the air by use of the hot water supplied from the hot water pipe to deal with the latent heat load, and to lower the temperature of the air via evaporation of water contained in the dehumidified air, thereby producing and supplying cooling air.

Preferably, the heating source is a gas-fired boiler or an oil-fired boiler.

Preferably, the hot water produced by the heating source has a temperature of 60 to 120° C.

In an air conditioning system using a dehumidifying cooling device of the present invention and having the above described configuration, there is an advantage gained in efficient air cooling operation by supplying hot water, produced by large-scale or small-scale district heating systems or gas-fired or oil-fired boilers installed in individual households, into the dehumidifying cooling device installed in each household.

BRIEF DESCRIPTION OF THE DRAWINGS

The above and other objects, features and other advantages of the present invention will be more clearly understood from the following detailed description taken in conjunction with the accompanying drawings, in which:

FIG. 1 illustrates the configuration of an air conditioning system using a dehumidifying cooling device according to a first embodiment of the present invention.

FIG. 2 illustrates the configuration of an air conditioning system using a dehumidifying cooling device according to a second embodiment of the present invention.

DESCRIPTION OF THE PREFERRED EMBODIMENTS

First Embodiment

The configuration of an air conditioning system using a dehumidifying cooling device, according to the first embodiment of the present invention, will be described in detail with the accompanying drawing.

In the following description of the present invention, a detailed description of known incorporated functions and configurations will be omitted when to include them would make the subject matter of the present invention rather unclear. Also, the terms used in the following description are defined taking into consideration the functions provided in the present invention. The definitions of these terms should be determined based on the whole content of this specification, because they may be changed in accordance with the option of a user or operator or a usual practice.

FIG. 1 illustrates the configuration of an air conditioning system using a dehumidifying cooling device according to a first embodiment of the present invention.

Referring to FIG. 1, the air conditioning system 100, using a dehumidifying cooling device according to the first embodiment of the present invention, comprises a heating source 110, a heat exchanger 120, a circulation pump 130, a heating pipeline 140, a user heat exchanger 150, and a dehumidifying cooling device 160.

The heating source 110 is used to produce hot water at 60 to 120° C. The heating source 110 is any one of a cogeneration plant, a heating boiler, a micro-turbine, a small gas engine, or a small gas turbine such that the heating source 110 can use hot water produced by large-scale and small-scale district heating facilities. Preferably, the heating source 110 has a heat reservoir (not shown) for storing hot water.

The heat exchanger 120 transfers the heat produced by the heating source 110 to circulating water, and conveys the hot water.

The circulation pump 130 is used to circulate the hot water that was heated in the heat exchanger 120.

The heating pipeline 140 is connected to the circulation pump 130 for the conveyance of hot water into a heat supply target area A or the withdrawal of used water from the heat supply target area A.

The user heat exchanger 150 is installed in a control office of the heat supply target area A, etc. The user heat exchanger 150 is connected to the heating pipeline 140 for conveying the hot water in the heating pipeline 140 to the heat supply target area A.

The dehumidifying cooling device 160 is installed in each household within the heat supply target area A. For this, the dehumidifying cooling device 160 is connected to a hot water pipe 151 associated with the user heat exchanger 150 and mounted in the household. The dehumidifying cooling device 160 is adapted to remove moisture from the air by use of the hot water supplied from the hot water pipe 151 to deal with the latent heat load and to lower the temperature of the dehumidified air via evaporation of water in the air, thereby producing and supplying cooling air. Here, the dehumidifying cooling device 160 carries out an air cooling operation by use of a regenerative evaporative cooler (REC). The regenerative evaporative cooler is designed such that the interior of the cooler is divided into a dry channel and a wet channel. In operation of the regenerative evaporative cooler, when part of the air passing through the dry channel is delivered into the wet channel, the air is cooled as water is evaporated by the high-temperature surface of the wet channel, thereby acting to absorb heat from the remaining higher temperature air passing through the dry channel. Thus, the air passing through the dry channel can be cooled to a dew-point temperature to the maximum extent without an increase of humidity.

The operation of the air conditioning system using the dehumidifying cooling device according to the first embodiment of the present invention will now be described in detail with reference to FIG. 1.

First, as the heating source 110 produces hot water, the heat exchanger 120 carries out the heat exchange from the hot water of the heating source 110 to water circulating along the heating pipeline 140, so as to transfer heat from the hot water into the circulating water in the heating pipeline 140.

After being completely heat exchanged in the heat exchanger 120, the resulting hot water is circulated in the heating pipeline 140 by operation of the circulation pump 130 installed in the heating pipeline 140.

The hot water is then conveyed to the heat supply target area A by way of the heating pipeline 140. The heating pipe 140 is also used for the withdrawal of the used water from the heat supply target area A.

As the hot water is conveyed to the user heat exchanger 150 connected to the heating pipeline 140, the heat exchanger 150 carries out a heat exchange operation to transfer heat from the conveyed hot water to water passing through the hot water pipe 151.

The resulting hot water is supplied into the dehumidifying cooling device 160 installed to each household within the heat supply target area A by way of the hot water pipe 151 that is connected to the user heat exchanger 150 and the dehumidifying cooling device 160. The dehumidifying cooling device 160 operates to remove moisture contained in the air by use of the hot water supplied from the hot water pipe 151 to deal with the latent heat load and to lower the temperature of the dehumidified air via evaporation of water in the air, thereby producing and supplying cooling air.

Second Embodiment

Now, the configuration of an air conditioning system using a dehumidifying cooling device according to a second embodiment of the present invention will be described in detail with reference to the accompanying drawing.

In the following description of the present invention, a detailed description of known functions and configurations incorporated herein will be omitted when it may make the subject matter of the present invention rather unclear. Also, the terms used in the following description are terms defined taking into consideration the functions obtained in accordance with the present invention. The definitions of these terms should be determined based on the whole content of this specification because they may be changed in accordance with the option of a user or operator or a usual practice.

FIG. 2 is a view illustrating the configuration of an air conditioning system using a dehumidifying cooling device according to a second embodiment of the present invention.

Referring to FIG. 2, the air conditioning system 200 using a dehumidifying cooling device according to the second embodiment of the present invention comprises a heating source 210, a hot water pipe 220, and a dehumidifying cooling device 230.

The heating source 210 is used to produce hot water of 60 to 120° C. The heating source 210 is a gas-fired boiler or an oil-fired boiler installed in each household. If necessary, the heating source 210 may be a briquette-fired boiler.

The hot water pipe 220 is installed in each household, and is used for conveyance of hot water from the heating source 210 or withdrawal of used water.

The dehumidifying cooling device 230 is connected to the hot water pipe 220 and installed in each household. The dehumidifying cooling device 230 is adapted to remove moisture contained in the air by use of hot water supplied from the hot water pipe 220 to deal with latent heat load and to lower the temperature of the dehumidified air via evaporation of water contained in the air, thereby producing cooled air. Here, the dehumidifying cooling device 230 carries out an air cooling operation by use of a regenerative evaporative cooler (REC). The regenerative evaporative cooler is designed such that the interior of the cooler is divided into a dry channel and a wet channel. In the regenerative evaporative cooler, as a part of the air passing through the dry channel is delivered into the wet channel, the air is cooled as water is evaporated by the high-temperature surface of the wet channel, thereby absorbing heat from the remaining higher temperature air passing through the dry channel. Thus, the air passing through the dry channel can be cooled to the lowest possible dew-point temperature without an increase of humidity.

The operation of the air conditioning system using the dehumidifying cooling device according to the second embodiment of the present invention will now be described in detail with reference to FIG. 2.

As the heating source 210 produces hot water, the hot water is supplied into the hot water pipe 220.

The hot water is supplied to the dehumidifying cooling device 230 installed in each household and connected to the hot water pipe 220. The dehumidifying cooling device 230 removes moisture from the air by use of the hot water supplied from the hot water pipe 151 to deal with latent heat load and to lower the temperature of the dehumidified air via evaporation of water in the air, thereby producing and supplying cooled air.

Consequently, with the use of the dehumidifying cooling device, it is possible to carry out a dehumidifying cooling operation for each household by supplying hot water into the dehumidifying cooling device.

As apparent in the above description, an air conditioning system using a dehumidifying cooling device according to the present invention can be installed in residential and business buildings, etc. In the air conditioning system, hot water produced by large-scale or small scale district heating facilities or a gas-fired or oil-fired boiler installed in each household, can be used in a dehumidifying cooling device installed in the household such that hot water for heating a room can be used to cool the room.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. An air conditioning system using a dehumidifying cooling device comprising:
    a heat source for producing hot water having a predetermined temperature;
    a heat exchanger for transferring heat from the hot water produced by the heating source, to circulating water;
    a circulation pump for circulating the resulting hot water heated in the heat exchanger by a predetermined pressure;
    a heating pipeline connected to the circulation pump for conveying the hot water to a heat supply target area or withdrawing used water from the heat supply target area;
    a user heat exchanger connected to the heating pipeline for conveying the hot water in the heating pipeline to the heat supply target area; and
    a dehumidifying cooling device connected to a hot water pipe, which is associated with the user heat exchanger and mounted in each household within the heat supply target area, so as to be installed in the household, the dehumidifying cooling device removing moisture from the air by use of the hot water supplied from the hot water pipe to deal with the latent heat load and to lower temperature of dehumidified air via evaporation of water contained in the air, thereby supplying cooled air.

2. The system according to claim 1, wherein the heating source is any one of a cogeneration plant, a heating boiler, a micro-turbine, a small gas engine, or a small gas turbine.

3. The system according to claim 1, wherein the hot water is produced by heating source having temperature of 60 to 120° C.

4. An air conditioning system using a dehumidifying cooling device comprising:

a heating source installed to each household for producing hot water having a predetermined temperature;

a hot water pipe for conveyance of the hot water produced by the heating source or withdrawal of used water; and a dehumidifying cooling device connected to the hot water pipe installed in each household, the dehumidifying cooling device removing moisture from the air by use of the hot water supplied from the hot water pipe to deal with the latent heat load and to lower the temperature of the dehumidified air via evaporation of water contained in the air, thereby producing and supplying cooled air.

5. The system according to claim 4, wherein the heating source is either one of a gas-fired boiler or an oil-fired boiler.

6. The system according to claim 4, wherein the hot water produced by heating source having temperature of 60 to 120° C.

* * * * *